United States Patent
Lawrence

[15] 3,678,758
[45] July 25, 1972

[54] PRESSURE INDICATING AND LIMITING INSTRUMENT
[72] Inventor: Charles R. Lawrence, Broken Arrow, Okla.
[73] Assignee: Frank W. Murphy Manufacturer, Inc., Tulsa, Okla.
[22] Filed: July 23, 1971
[21] Appl. No.: 151,592

[52] U.S. Cl. ............................73/411, 200/81.8, 200/56 R
[51] Int. Cl. ..........................................................G01k 7/04
[58] Field of Search................200/81.8, 81.4, 56 R; 73/411

[56] References Cited
UNITED STATES PATENTS
2,741,987  4/1956  Murphy et al........................200/56 R Primary Examiner—Donald O. Woodiel
Attorney—Kimmel, Crowell & Weaver

[57] ABSTRACT

A pressure gauge utilizes a Bourdon tube and associated mechanical linkage to indicate pressure on a calibrated dial between predetermined limits. High pressure and low pressure limit switches are fixedly secured to a carrier having lost motion connections with the Bourdon tube and said linkage. Adjustable high pressure and low pressure stops on the face of the instrument positively interrupt the movement of the instrument pointer and thereby lock said linkage. Continued expansion or contraction of the Bourdon tube utilizes said lost motion connections with said switch carrier to operate the high pressure and low pressure limit switches in proper sequence. The principle of operation is also adaptable to Bourdon tube temperature gauges.

11 Claims, 6 Drawing Figures

Patented July 25, 1972

INVENTOR
CHARLES R. LAWRENCE
BY

Kimmel, Crowell & Weaver
ATTORNEYS

Patented July 25, 1972

INVENTOR
CHARLES R. LAWRENCE
BY

Kimmel Crowell & Weaver
ATTORNEYS

PRESSURE INDICATING AND LIMITING INSTRUMENT

BACKGROUND OF THE INVENTION prior art instruments are known which use Bourdon tubes to produce movement of a pointer over a dial to indicate changes in pressure or temperature. Such prior art instruments are also known which include arrangements of electrical switches to start up or stop an instrumentality, such as a motor or pump, in response to low pressure or high pressure limits measured by the instrument. Examples of such prior art are contained in U.S. Pat. No. 2,211,052 to Cole, and U.S. Pat. No. 2,274,329 to Hammond.

Generally speaking the mechanisms and linkages employed in the prior art instruments of the type involved have tended to be complex and rather costly and sometimes not completely reliable in operation due mainly to complexities and large numbers of parts.

The principal objective of the present invention is, therefore, to improve upon the prior art through the provision of a much more simplified and direct acting linkage between the Bourdon tube and the indicating pointer, such linkage including a carrier link for a pair of high and low pressure limit switches having unique slotted lost motion connections with the movable end of the Bourdon tube and with the gear sector forming a part of the instrument linkage. The present instrument provides a pressure (or temperature) gauge with built-in single pole double throw high pressure and low pressure limit switches. On the face of the instrument are mounted a pair of independently adjustable high and low pressure stop elements which are disposed in the path of movement of the pointer which sweeps over the calibrated instrument dial. These stop elements are rotatable through substantially a full circle, thus enabling the widest possible range of pressure limits to be established. When the stops arrest movement of the instrument pointer in either direction, continued expansion or contraction of the Bourdon tube actuator will utilize the mentioned lost motion connections with the limit switch carrier link and thereby effect opening and closing of the two single pole double throw switches in the proper sequence to gain the desired instantaneous control of the external device being monitored by the instrument.

In contrast to the prior art, all switching is accomplished inside the instrument. Because the switching is accomplished via single pole double throw snap acting microswitches, contact ratings of the instrument can be greatly increased in comparison to customary ratings. The instrument can be utilized for a complete start-stop sequence of an electric motor from some external pressure (or temperature). Auxiliary relays of a latching or electrical interlock type are no longer required. In lieu of the switches, pneumatic valves of the snap acting type may be tripped by the same instrument mechanism to allow control of a pneumatic system. These and other advantages of the invention over the prior art will be readily recognized by those skilled in the art during the course of the following description.

DESCRIPTION OF THE DRAWING FIGURES

DETAILED DESCRIPTION OF PREFERRED EMBODIMENT

Figure 1:
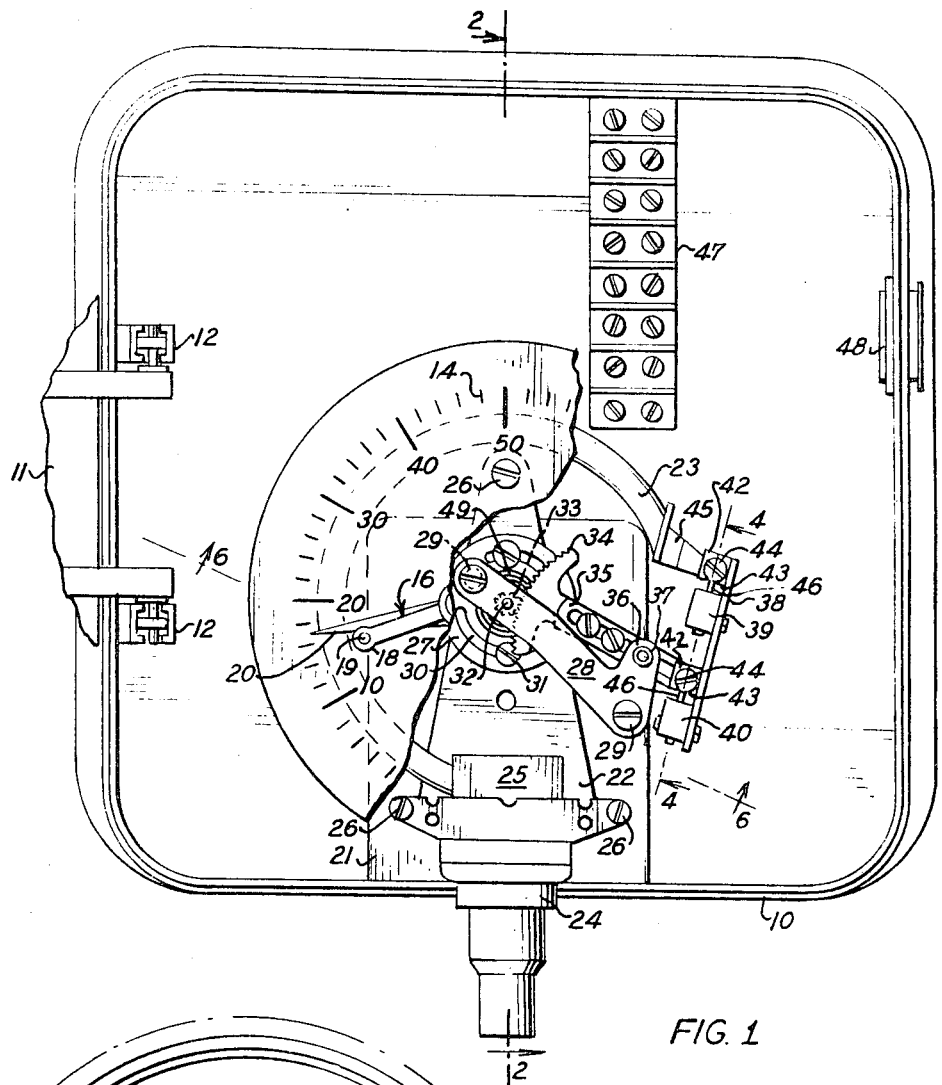
FIG. 1 is a plan view of a pressure indicating and limiting instrument embodying the invention with the instrument cover opened for exposing to view the interior components of the instrument.

Referring to the drawings in detail wherein like numerals designate like parts throughout, the numeral 10 designates a substantially rectangular instrument housing base or section having hinged thereto a companion housing cover 11, the hinge means being indicated at 12. The housing cover 11 has a circular transparent window or lens 13 to permit viewing of the underlying calibrated instrument dial 14 which may be graduated in pounds per square inch of pressure, for example, or in some cases degrees of temperature.

Figure 5:
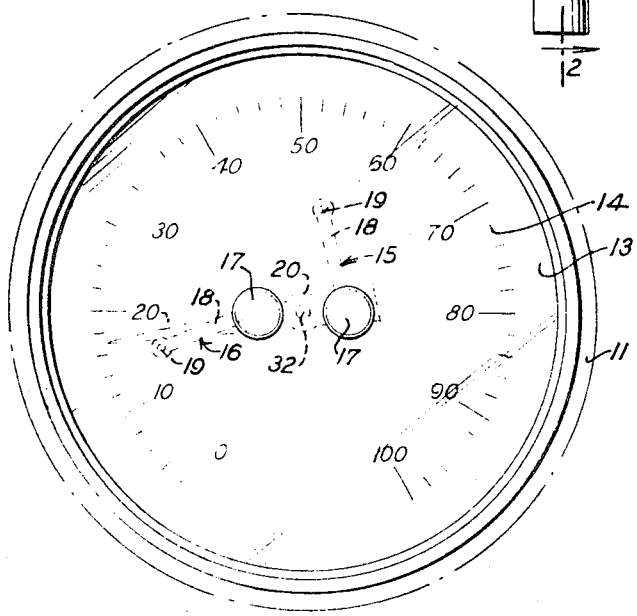
FIG. 5 is a fragmentary plan view of the instrument with the cover closed and illustrating the adjustable relationship of high pressure and low pressure limit stops to the pointer of the instrument.
Figure 2:
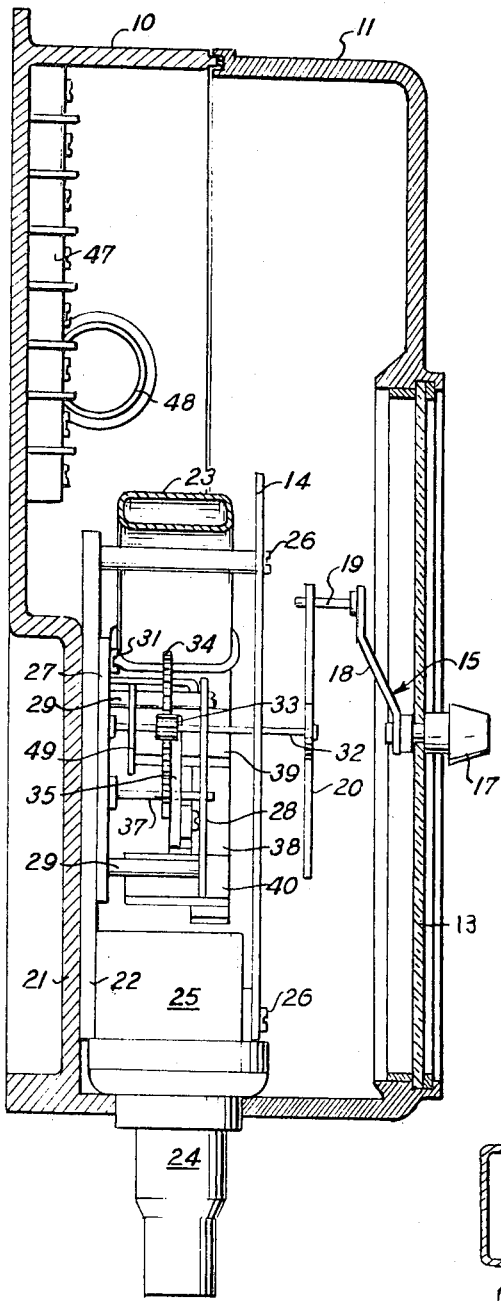
FIG. 2 is a vertical section taken on line 2—2 of FIG. 1.

Journaled directly on the window or lens 13 are a pair of independently operable rotary high and low pressure stops 15 and 16, each having an external operating knob 17 and an interior sweep arm 18 beneath the lens 13, mounted on a common shaft with the associated knob. A stop pin 19 is dependingly rigidly secured to the outer end of each arm 18 and these stop pins project into the path of movement of the rotary instrument pointer 20 which sweeps over the calibrated dial or face 14 of the instrument. The rotational axes of the two adjustable pointer stops 15 and 16 are spaced apart on opposite sides of the pointer rotational axis, as shown in FIG. 5. The two adjustable stops are adapted independently to sweep substantially the entire circumference of the dial or face 14.

The housing base 10 has an elevated boss 21 near one side wall thereof upon which the mounting plate 22 of a conventional Bourdon tube unit is fixedly mounted. The Bourdon tube unit comprises a Bourdon tube proper indicated by the numeral 23 and a pressure fitting or nipple 24 opening through the adjacent side wall of the housing base 10 and having a portion 25 anchored to the mounting plate 22 and placing the nipple in communication with the Bourdon tube. The Bourdon tube unit consisting of the elements 22, 23, 24 and 25 also contains three mounting screws 26 for the aforementioned dial 14 to anchor the latter.

Mounted upon the plate 22 is a linkage support structure consisting of a base plate 27 and an elevated bearing plate 28. These two parallel superposed plates are rigidly interconnected by spacer posts 29. The base plate 27 has a pair of arcuate adjusting slots 30 formed therethrough receiving screws 31, and this allows the linkage support structure including the elements 27, 28 and 29 to be circumferentially adjusted with respect to the center of the Bourdon tube 23 and to be locked in the adjusted position.

A pointer shaft 32 extends between the plates 27 and 28 and above the latter plate and is journaled for rotation in suitable bearing elements carried by these two plates. The instrument pointer 20 is conventionally attached to the top of the shaft 32 for rotation therewith. Between the plates 27 and 28, the shaft 32 carries a small spur gear 33 fixed thereto, in mesh with a sector gear 34 having a two-part slotted adjustable length arm 35.

Figure 3:
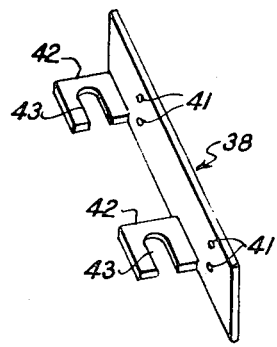
FIG. 3 is a perspective view of a slotted carrier link for limit switches forming an important part of the invention.
Figure 4:
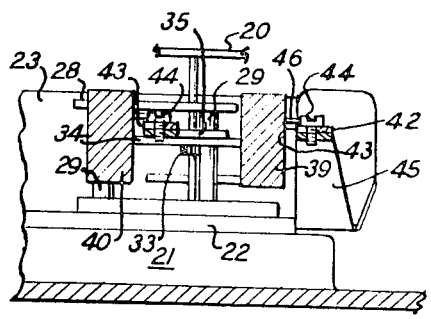
FIG. 4 is an enlarged transverse vertical section taken on line 4—4 of FIG. 1.
Figure 6:
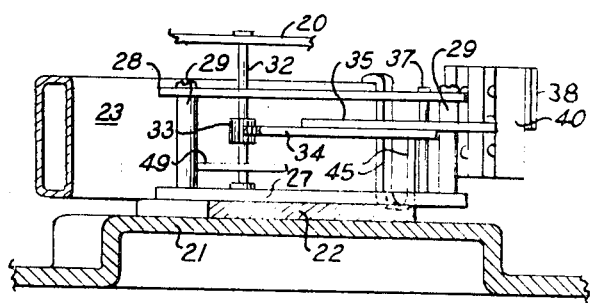
FIG. 6 is a fragmentary vertical section taken on line 6—6 of FIG. 1.

Extending between two lateral extensions 36 of the plates 27 and 28 is a vertical pivot shaft 37 upon which is pivoted the adjustable length arm 35 of the sector gear 34. The arm 35 is pivoted to the shaft 37 between the ends of the arm. The shaft 37 is parallel to the pointer shaft 32. A limit switch carrier link 38 forming a very important part of the invention is shown in detail in FIG. 3. The main web of this carrier link serves to support a pair of spaced microswitches 39 and 40, each of which are single pole double throw (SPDT) snap switches. These two switches are fixedly mounted on the main web of the carrier link 38, as shown. The main web has suitable openings 41, FIG. 3, to accommodate screws which secure the two switches in place. Spaced right angular tabs 42 are formed on the carrier link 38 integrally and have slots 43 opening through corresponding sides thereof. These slots receive movably the shanks of switch actuating elements 44 in the form of two screws which are anchored adjustably to a rigid extension finger 45 on the free end of the Bourdon tube and to the end of the arm 35 remote from sector gear 34, FIG. 1. The two limit switches 39 and 40 have actuator pins 46 facing in the same direction for engagement with the elements 44 at prescribed times. The required relative movements between the two switches and the actuating elements 44 is achieved through the lost motion connections afforded by the slots 43 between the carrier link 38 mounting the two switches, the Bourdon tube extension finger 45 and the gear sector arm 35. This lost motion connection in conjunction with the positive stopping of the pointer 20 by the stop elements 19 is at the heart of the invention.

A simple junction block 47 is mounted on the floor of the housing base 10 to receive the conventional lead wires from the two microswitches 39 and 40, not shown. These lead wires may include a normally closed contact lead, a normally open contact lead, and a common lead from each switch. The conventional electrical connections to the external device being monitored by the instrument are made from the junction block 47 through an opening 48 in one side wall of the housing base 10. This external device may be a motor or the like, as previously explained.

A conventional feature of the instrument which should be mentioned in concluding the description of structure is an instrument pointer dampening spring 49 for the pointer shaft 32 interconnecting this shaft and the adjacent fixed post 29.

OPERATION

As pressure increases through the fitting 24, the Bourdon tube 23 expands with a corresponding movement of its extension finger 45. This causes a corresponding movement of the switch carrier link 38 which in turn swings the a 35 on the axis of pivot shaft 37 and moves sector gear 34. The sector gear revolves the small spur gear 33 with pointer shaft 32 and the pointer 20 sweeps over the indicator dial 14 to indicate pressure through window or lens 13.

Assuming a prior adjustment of the pointer stops 19 at high pressure and low pressure limits, the pointer 20 will engage the low pressure limit stop 19 as pressure decreases and this positively arrests movement of the pointer in the counterclockwise or low pressure direction and correspondingly locks the gear elements 33 and 34 and the carrier link 38. As pressure continues to fall, Bourdon tube 23 will continue to contract and the switch operator element 44 will engage the actuator pin 46 of limit switch 39 and close this switch, to thereby produce a low pressure SPDT signal to the external device whose operation is being monitored. The lost motion connection of the element 44 with the adjacent slot 43 in link 38 is utilized to achieve the necessary relative movement between the elements 44 and 46 to operate the switch 39 when the pointer 20 is stopped while moving in the low pressure direction.

As pressure to the instrument increases, the Bourdon tube 23 expands causing the operator 44 to move away from the element 46 of limit switch 39, again utilizing the slotted connection with the link 38 to gain the necessary relative movement. This will re-open the switch 39. If pressure increases to the upper limit established by the high pressure stop 19, the pointer 20 moving in the clockwise direction will engage this stop and the pointer movement is instantly arrested. This again locks the pointer against further clockwise movement and locks the gear elements 33 and 34. Further expansion of the Bourdon tube due to a further increase in pressure will shift the carrier link 38 relative to the operating element 44 for limit switch 40, again taking advantage of the lost motion connection between the carrier link and the elements 35 and 44. This will cause the actuator pin 46 of switch 40 to engage the stationary operator 44 on locked arm 35 and this closes limit switch 40 to produce a high pressure SPDT signal to the external device. When pressure begins to fall and the Bourdon tube 23 contracts, the switch 40 and its actuator pin 46 will move away from the adjacent operator element 44 and the switch 40 will re-open, again utilizing the slotted lost motion connection between the carrier link 38 and the element 44 on the arm 35.

It may now be seen that a very simplified instrument is provided which will at once indicate pressure between high and low preset limits. These limits are established by the adjustable stops 19 which are independently movable over the entire indicator dial 14. The instrument contains built-in or internal SPDT high pressure and low pressure microswitches which are fixedly secured to a carrier link having lost motion connections with the Bourdon tube and the gear movement which drives the pointer. Through these lost motion connections, the necessary relative movements between the two limit switches and the switch operators on the Bourdon tube and the gear movement are obtained, whereby the switches may be properly cycled to produce the high and low pressure electrical signals to a remote device.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A pressure indicating and limiting instrument comprising a Bourdon tube gauge including a sweep pointer and a rotary shaft carrying the pointer, a pair of independently adjustable high pressure and low pressure stop elements in the path of movement of said pointer in the high pressure and low pressure directions, gearing connected with the pointer shaft to drive the pointer responsive to expansion or contraction of the Bourdon tube due to increases or decreases of pressure therein, a carrier link having lost motion connections with the Bourdon tube and said gearing to allow relative movements between the link, Bourdon tube and said gearing, a pair of high pressure and low pressure limit switches fixedly mounted on the carrier link and bodily movable therewith, and a pair of switch operators on the Bourdon tube and said gearing adapted to operate said switches in sequence when said stop elements arrest movement of said pointer in the high pressure and low pressure directions, said lost motion connections then allowing relative movements between said switches and switch operators caused by continued expansion or contraction of the Bourdon tube.

2. The structure of claim 1, and said lost motion connections comprising slots in the carrier link movably engaging said pair of switch operators.

3. The structure of claim 2, and said switch operators comprising a pair of screws mounted on the Bourdon tube and a part of said gearing and having shanks engaging through said slots and heads adapted to engage actuator pins of said switches.

4. The structure of claim 3, and said pair of limit switches comprising single pole double throw switches.

5. The structure of claim 1, and said pair of stop elements comprising stop pins in the path of movement of said pointer in intersecting relation therewith, rotary sweep arms carrying said pins, and manual knobs secured to said sweep arms for turning them independently in opposite directions, said instrument having a transparent lens and said knobs journaled for rotation directly upon said lens.

6. The structure of claim 1, and said gearing comprising a spur gear on said pointer shaft directly driving the pointer shaft, a sector gear meshing with said spur gear, a pivoted arm carrying the sector gear, and a pivotal connection between said arm and carrier link, said pivotal connection comprising one of said lost motion connections.

7. The structure of claim 6, and the pivot of said arm being positioned between the ends of the arm and having an access spaced from and parallel to the axis of said pointer rotary shaft.

8. The structure of claim 7, and a support structure in the instrument for said pointer shaft and gearing including the pivot for said arm, said support structure being bodily adjustable circumferentially around the rotational axis of the pointer shaft and being lockable in the selected adjusted position.

9. The structure of claim 8, and said instrument including a housing for completely enclosing the Bourdon tube gauge, said gearing, carrier link and limit switches, a Bourdon tube mounting plate formed integral with the tube and secured to a wall of said instrument housing, and said support structure mounted on said mounting plate and being circumferentially adjustable and lockable thereon.

10. The structure of claim 9, and said support structure comprising an upper and lower pair of support plates forming spaced bearings for the rotary pointer shaft and a parallel pivot shaft for the arm carrying said sector gear.

11. The structure of claim 10, and an electrical junction block mounted on a wall of said housing and adapted to receive lead wires from said pair of limit switches and also enabling electrical connections to be made between said switches and an external device whose operation is being monitored by the instrument.

* * * * *